United States Patent [19]

Thiele

[11] Patent Number: 5,733,969

[45] Date of Patent: Mar. 31, 1998

[54] ZEOLITE CATALYST FOR THE POLYCONDENSATION OF POLYESTER

[75] Inventor: Ulrich Thiele, Bruchkoebel, Germany

[73] Assignee: Zimmer Aktiengesellschaft, Germany

[21] Appl. No.: 772,821

[22] Filed: Dec. 24, 1996

[30] Foreign Application Priority Data

Sep. 20, 1996 [DE] Germany ............... 196 38 549.0

[51] Int. Cl.$^6$ ................................................ C08K 3/34
[52] U.S. Cl. ........................ 524/791; 528/275; 528/280; 528/282; 528/283; 528/285; 528/286; 528/302; 528/307; 528/308; 528/308.6; 524/706; 524/777; 524/783; 524/785; 524/786; 524/791; 502/63; 502/64; 428/35.7
[58] Field of Search ........................... 528/275, 280, 528/282, 283, 285, 286, 302, 307, 308, 308.6; 524/706, 777, 783, 785, 786, 791; 502/63, 64; 428/35.7

[56] References Cited

U.S. PATENT DOCUMENTS

| | | | |
|---|---|---|---|
| 3,876,608 | 4/1975 | Anderson et al. | 523/218 |
| 3,983,081 | 9/1976 | Dieterich et al. | 521/100 |
| 4,282,137 | 8/1981 | Kohler et al. | 524/450 |
| 4,775,585 | 10/1988 | Hagiward et al. | 428/323 |
| 4,785,060 | 11/1988 | Nagler | 525/444 |
| 5,041,525 | 8/1991 | Jackson | 528/272 |
| 5,187,216 | 2/1993 | Cassell et al. | 524/261 |
| 5,244,667 | 9/1993 | Hagiwara et al. | 424/409 |

*Primary Examiner*—Samuel A. Acquah
*Attorney, Agent, or Firm*—McDonnell Boehnen Hulbert & Berghoff

[57] ABSTRACT

A zeolite polycondensation catalyst comprising an alkali- or alkaline earth metal aluminum silicate zeolite having an original water content of 12 to 30 weight % and a solubility, measured at 260° C., in an esterification mixture consisting essentially of bis(hydroxy ethylene)terephthalate, of over 8.0 weight %, and an average particle size of less than 1.0μ. The present invention is also a process for the production of polyester using this catalyst.

19 Claims, 1 Drawing Sheet

ZEOLITE CATALYST FOR THE POLYCONDENSATION OF POLYESTER

BACKGROUND OF THE INVENTION

1. Field of the Invention

The present invention relates to zeolite catalysts in the polycondensation of polyesters, particularly of polyethylene terephthalate and its copolymers. The invention further relates to a process for the production of polyesters through the use of this zeolite polycondensation catalyst.

2. Summary of the Related Art

The production of polyesters is generally accomplished by an esterification reaction of a diol with a dicarboxylic acid or a re-esterification of a diol with a lower dicarboxylic acid ester, such as dimethyl ester. Both esterification reactions produce a dicarboxylic acid diester, which when subject to elevated temperatures and reduced pressure is polycondensed in a single or multiple stages. The re-esterification and polycondensation reactions require catalysts. The esterification reaction does not require a catalyst, but the reaction can be accelerated in the presence thereof. Sb, Ti, Ge, and Sn compounds are suitable catalysts for esterification, while re-esterification is catalyzed by Mn, Co, and Zn compounds and polycondensation is catalyzed by Sb, Ti, Pb, Ge, Zn, and Sn compounds. Quantities of catalysts suitable for esterification, re-esterification and polycondensation are in the range of from about 20 to about 500 ppm, as metal, in relation to the polyester.

U.S. Pat. No. 5,041,525, discloses polycondensation in the absence of an antimony catalyst, replacing this known catalyst with about 900 to 2700 ppm of a crystalline sodium-aluminum silicate zeolite ground to a particle size of 0.5–2.0µ, with a maximum effective pore size of 10 Å. Commercial crystalline sodium-aluminum silicate zeolite products, with a water content of less than 1.5 to 2.5%, have been used in the polycondensation of polyesters, but the relatively high quantity of catalyst required in the reaction produces polyesters with poor surface characteristics and decreased clarity. This is because the amount of this polyester-insoluble catalyst in the reaction influences the surface characteristics and the clarity of the resultant polyester. Such catalysts are disadvantageous for the production of polyesters whose intended use requires good surface characteristics and high clarity.

U.S. Pat. No. 4,282,137 describes improved polyester dye affinity by the addition, before preliminary condensation, of 0.1–4.0 weight % zeolite milled to a particle size of less than 4µ and pore diameter of approximately 5–6 Å, and dried for several hours at 290° C. This patent does not disclose the use of this zeolite formulation as a catalyst.

U.S. Pat. No. 3,876,608 describes the improvement in the winding characteristics of polyester films through the addition, before preliminary condensation, of 5–300 ppm of a conventional zeolite, with a particle size of 2–10µ. This patent does not disclose the use of this zeolite formulation as a catalyst.

International patent application number WO 93/21264 describes improved thermal stability of copolyesters by adding, prior to the polycondensation reaction, 50 ppm to 10 weight % of a 4 Å zeolite with a particle size of 0.1–50µ. This zeolite can be substituted with other metal atoms to achieve similar thermal stability. No catalytic effect of the zeolite was described.

U.S. Pat. No. 5,187,216 and WO 94-29378 describe the addition of 100–1000 ppm of zeolite and a conventional polycondensation catalyst, prior to polycondensation, to promote faster crystallization of a polyester that has a decreased acetaldehyde content.

Presently there are no zeolite polycondensation catalysts that provide increased catalytic activity while permitting the formation of polyesters that display desirable surface characteristics and high clarity.

SUMMARY OF THE INVENTION

The present invention comprises a zeolite catalyst, useful in the polycondensation of polyesters, that has improved catalytic activity and produces polyesters with desirable surface characteristics and high clarity. The present invention further comprises a method of producing polyesters having lower carboxyl end group concentration and of high brilliance and clarity using the zeolite polycondensation catalyst.

The polycondensation catalyst of the present invention is comprised of an alkali- or alkaline earth metal aluminum silicate zeolite, with an original water content of between about 12 to about 30 weight %, and a solubility of more than 8.0 weight % (each based on dry substance) at 260° C. in an esterification mixture comprising essentially bis(hydroxyethylene)terphthalate. The polycondensation catalyst of the present invention is further characterized by an average particle size of less than 1.0µ. The zeolite polycondensation catalyst is useful in the production of polyester, preferably in a quantity of from 10 to 800 ppm based on dry substance and in relation to the polyester.

DETAILED DESCRIPTION OF THE PREFERRED EMBODLMENTS

Figure 1:
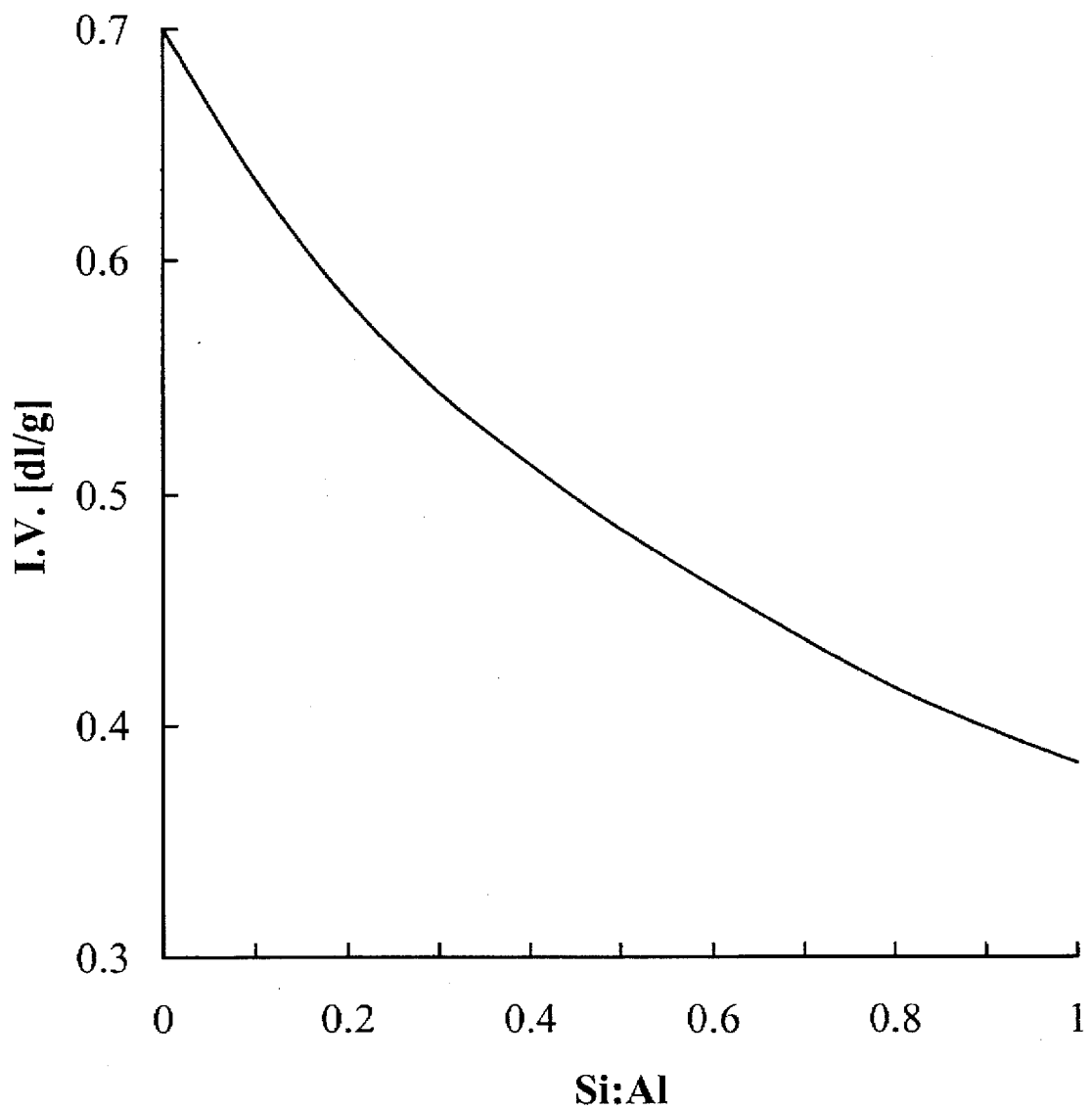
FIG. 1 is a plot of the intrinsic viscosity (I.V.) of polyester as a function of the atomic ratio of dissolved Si to dissolved Al.

Zeolites are commercially available in two different grades. One zeolite grade has a water content of less than approximately 3 weight % and can be used as catalysts and adsorbent agents. The other grade of zeolites has an original water content of 12 to 30 weight % and can be used as additives to washing agents or detergents.

The catalytically active zeolites have only slight activity in the polycondensation of polyesters, which makes the use of large quantities (at least 1000 ppm) necessary for any noticeable activity. Zeolites used in modem washing agents as calcium absorbers or so-called "builders" have, demonstrated surprisingly, a considerably higher catalytic activity in the polycondensation of polyesters than the "catalytic" zeolites. This catalytic activity in the polycondensation of polyesters was heretofore unknown. These zeolites have an original water content of between from about 12 to about 30 weight %, preferably between from about 18 to about 25 weight %. These zeolite compositions are distinctly superior to dried zeolites in catalyzing the polycondensation of polyesters. It is important that the water content in the zeolite originate from the zeolite production in which the zeolite is only partially dewatered and not dried. A subsequent moistening of dried zeolites brings about no gain of catalytic activity relative to dried zeolites.

An increase in the catalytic activity can be obtained by using zeolites that have been ground from zeolite crystals to an average particle size of less than 1.0µ, preferably less than 0.50µ and, most particularly preferred, less than 0.35µ. The determination of the particle size is carried out in isopropanol by means of ultracentrifugation (Particle Size Distribution Analyzer, Type CAPA 700, Horiba). The grinding of the zeolites can be carried out in dry form, but is preferably carried out in a range from about 30 to about 80 weight % suspension of zeolite in a diol, such as ethylene glycol, which forms the basis of the polyester. Particularly preferred diol suspensions contain between from about 30 to about 50 weight % zeolite. The suspension offers the advantages of pumpability, easy dosability, simplification of the process, and better distribution of the zeolite catalyst in the reaction mixture.

In addition, zeolites which are particularly soluble in hot esterification mixtures have the greatest polycondensation activity. Solubility of the zeolite catalyst in an esterification mixture comprising essentially bis(hydroxyethylene) terephthalate can be determined as follows. Terephthalic acid is esterified with ethylene glycol to produce bis (hydroxyethylene)terephthalate with a yield of over 85%. The resulting esterification mixture, essentially consisting of bis(hydroxyethylene)terephthalate, is mixed with about 1.00 weight % of the zeolite catalyst of interest and heated for 1 hour at 260° C. under reflux. This mixture is cooled and the resulting material ground to powder. The powder is then dissolved in a commonly available polyethylene terephthalate solvent (e.g., 10 g of a zeolite-containing powder in 40 ml of phenol/dichlorobenzene (3:2 weight parts)), while heating to 60° C. The mixture is then centrifuged at a speed of at least 10,000 RPM, the remaining supernatant removed, and a portion subjected to atom absorption spectrometry or another appropriate method for determining the presence of alkali- or alkaline earth metal, aluminum, and silicon. A blank is run to determine the solubility of the catalyst in the polyethylene terephthalate solvent while heating to 60° C. and, if applicable, the silicon contamination from the glassware is included.

The polycondensation zeolite catalysts of the present invention have catalytic activity comparable to conventional antimony catalysts if, in addition to the water content and the particle size previously stated, they have a solubility in an esterification mixture, determined as described above, of over 8.0 weight % (preferably of at least 10.0 weight %) in relation to the dry mass of the zeolite.

Furthermore, the solubility of the individual elements that form the zeolite influence the catalytic effect of the zeolite catalyst. The higher the atomic ratio of the aluminum to silicon that has entered into solution, the higher the catalytic activity of the zeolite (Example 1). The greatest catalytic activity is attained when the atomic ratio Al:Si:alkali/ alkaline earth dissolved in the ethylene glycol solution are about 1:≦0.5:(0.1 to 30), preferably about 1:≦0.05:(10 to 30). FIG. 1 depicts the intrinsic viscosity (I.V.) of polyester as a function of the atomic ratio of dissolved Si to dissolved Al. Boiling the zeolite ethylene glycol suspension produced results, as a secondary effect, in an approximately 20% reduction of the average particle size of the zeolite catalyst. Therefore, cooking reduced the average particle size of the zeolite from, for example, about 0.5μ to about 0.4μ. This size reduction, together with particle dissolution as previously described, increases the catalytic activity of the zeolite polycondensation catalyst.

The stoichiometric composition of the zeolites, apart from the water content and the ratio of the Si:Al, is of subordinate significance. All zeolites with a molar ratio of $SiO_2$ to $Al_2O_3$ in the range of from about 1.0 to about 4.0, preferably from about 1.5 to about 3.0, can be used in the present invention provided the conditions as described above are met.

Alkali- or alkaline earth metals may be present in the zeolites of the present invention. For reasons of availability, sodium is preferred as an alkali metal. Other materials may be present in the zeolite polycondensation catalysts of the present invention. For example, cobalt blue toner, a coloring agent often used in polyester synthesis, can be used to replace the alkali- or alkaline earth atoms of the zeolite in amounts up to 5 weight % of bivalent cobalt atoms.

Typically, the esterification reaction is carried out either without catalyst or in the presence of 5 to 100 ppm of a conventional esterification catalyst such as antimony, titanium and/or germanium. The reesterification is carded out with conventional catalysts. Particularly useful are manganese, cobalt and/or zinc. Esterification and reesterification catalysts must be deactivated before the addition of the zeolite catalyst by adding an approximately stoichiometric quantity of a phosphorus-oxygen compound, such as phosphoric acid, phosphorous acid, phosphonic acid, carboxy phosphonic acid and related compounds. Incomplete deactivation of the catalyst or addition of an excess of deactivation compound reduces the activity of the zeolite polycondensation catalyst of the present invention.

Therefore, the addition of the polycondensation catalyst may take place at any time prior to the beginning of the polycondensation reaction provided estefification- or reesterification catalysts are either not present in the reaction mixture or have already been deactivated. Also, deactivating compounds, such as described above, should not be free in solution immediately prior to the addition of the zeolite polycondensation catalyst. In non-catalytic esterification, about 1 to about 50 ppm of phosphorus, preferably about 2 to about 10 ppm of phosphorous as phosphorus containing stabilizer, is added to the monomeric mixture, followed by the addition, at the earliest time after the completed feeding-in of the monomeric mixture, of the zeolite catalyst. Preferred mounts of the zeolite polycondensation catalyst are from about 10 to about 800 ppm more preferred are amounts from about 50 to about 500 ppm in relation to the dry substance and polyester. The complete feeding-in of the monomeric mixture corresponds to a yield of the esterified product, under these conditions, of about 60 to about 98%.

The yield or estefification level (U) is computed from the saponification number ($V_z$) and the acid number ($S_z$) of the reaction mixture by the formula $U=(V_z-S_z)\times 100/V_z$. The saponification number is determined by saponification with potassium hydroxide in n-propanol and potentiometric titration. The acid number is determined by potentiometric titration in dimethyl formamide.

Polyethylene terephthalates and their copolymers produced in accordance with the method of the present invention are characterized by a particularly low diethylene glycol content (usually less than 0.8 weight % (without added diethylene glycol)), carboxyl end group concentration of less than 20 meq/kg (preferably less than 15 meq/kg) and good transparency. Polyethylene terephthalate containing from about 0 to about 10 weight % isophthalic acid and/or 1,4-cyclohexane dimethanol produced by non-catalytic esterification and subsequent polycondensation with the zeolite catalyst in the absence of matting agents and the like has a turbidity of less than 2 nephelometric turbidity units (NTU). The material thus produced is well-suited for transparent packaging and bottles, especially refillable beverage bottles.

Polyesters produced by the method of the present invention include polymers of terephthalic acid or 2,6-naphthalenedicarboxylic acid and ethylene glycol, 1,3-propanediol, 1,4-butandiol or 1,4-cyclohexane dimethanol and their copolymers with other dicarboxylic acids and/or diols, such as, for example, isophthalic acid, terephthalic acid, 1,4-cyclohexane dicarboxylic acid, 2,6-naphthalene dicarboxylic acid, p-hydroxy benzoic acid, 4,4'-biphenyldicarboxylic acid, adipic acid, diethylene glycol, 1,4-butandiol, 1,4-cyclohexane dimethanol, polyglycol with a molecular weight under 1000. The preferred polyester is polyethylene terephthalate with from about 0.5 to about 2.0 mass % of diethylene glycol (formed during process and, if necessary, added to the monomers) about 1.0 to about 5.0 mass % of comonomers selected from the group comprising isophthalic acid, 2,6-naphthalene dicarboxylic acid, p-hydroxy benzoic acid and 1,4-cyclohexane dimethanol, and about 0 to about 1,000 ppm of pentaerythrite, each in relation to polyester.

The polyester can, if necessary, be granulated after polycondensation, and the granulate can be crystallized and after-condensed in the solid phase. In this case, it is essential that the esterification or re-esterification catalyst be deactivated, and no excess deactivation compound present.

Additives, such as conventional chain branching agents, anti-oxidant agents, matting agents and/or coloring agents may be added to the reaction mixtures. Polyester produced in accordance with the method of the present invention is nearly colorless but a blueing agent can, however, depending on the purpose of use, be added. A few ppm of an organic, polyester-soluble, blue or reddish-blue coloring agent or about 2 to about 50 ppm cobalt in the form of a polyester-soluble salt and/or as a component of the zeolite polycondensation catalyst are suitable as a blue toner in the polyester produced. The addition of the blue toner can be carried out at any time prior to the beginning of the polycondensation reaction.

EXAMPLES

The following examples illustrate preferred embodiments of this invention as well as preferred methods for using compositions of this invention. In the following examples the parameters reported were measured as described below.

The intrinsic viscosity (I.V.) was measured at 25° C. in a solution of 500 mg polyester in 100 ml of a mixture of phenol and 1,2-dichlorobenzene (3:2 weight parts).

The diethylene glycol (DEG) contained in the polyester was determined by gas chromatographic means in the reesterification mixture of 1 g polyester with 30 ml methanol and 50 mg/l of zinc acetate, obtained in the Carius tube at 200° C.

The concentration of the COOH end groups was determined by means of photometric titration with 0.05 N of ethanolic caustic potash solution and bromo thymol blue of a solution of the polyester in a mixture of o-cresol and chloroform (70:30 weight parts).

The determination of the turbidity degree in "nephelometric turbidity units" (NTU) was performed on a 10 weight % solution of polyester in phenol/1,2-dichlorobenzene (3:2 weight parts) placed in a cuvette with 22.2 mm diameter (standard norm, conventional for water, number DIN 38 404, Part 2) using a Hach nephelometer (Type XR, U.S. Pat. No. 4,198,161). The intensity of the scattered light was blanked against a formazine standard solution (approximately 0.3 NTU).

The measurement of the Hunter color value "b" was carried out on a polyester granulate, which was crystallized in a drying cabinet at 135°±5° C. over 1 hour and subsequently ground to particle size of <400μ. The color values were measured by a three-range color measuring device. The color tone of the polyester samples were measured with three photocells, with a red, green, or blue filter connected in series to each (X-, Y- and Z-values repectively). The HUNTER color value was derived according to the following formula:

$b=(7.0 \div \sqrt{Y}) \times (Y-0.8467 \times Z)$.

Examples 1–4

Solubility of Zeolite Polycondensation Catalyst in Hot Esterification Mixture

A 30- to 50-weight % suspension of a zeolite of the present invention, as used in the production of polyester, was boiled for 2 hours in ethylene glycol while agitated under reflux. After cooling, a portion of this suspension was centrifuged at 9,000 RPM and the supernatant removed and analyzed by atomic absorption spectroscopy to determine the content of aluminum, silicon and alkali- or alkaline earth metal. Thereafter, a terephthalate ethylene glycol esterification product produced without catalyst and having an intrinsic viscosity of 0.20 dl/g was polycondensed, under the same conditions, in the presence of 250 ppm (as a dry substance) of four different zeolite polycondensation catalysts: (A) ground, non-suspended zeolite; (B) the portion of the boiled suspension not centrifuged that was diluted with ethylene glycol to 1.36 weight % zeolite dry substance; (C) the supernatant; and (D) the undissolved zeolite residue that was centrifuged off.

The results of this test are summarized in Table 1.

TABLE 1

| | | Polyester | | | |
| Example | Catalyst* | I.V. [dl/g] | COOH [meq/kg] | DEG [weight %] | Color |
| --- | --- | --- | --- | --- | --- |
| 1 | A | 0.598 | 10 | 0.94 | White |
| 2 | B | 0.660 | 12 | 0.87 | White |
| 3 | C | 0.689 | 10 | 0.80 | White |
| 4 | D | 0.584 | 42 | 0.87 | White |

*Commercial product, Wessalith P, from Degussa AG, Hanau, Germany.

In each of the following examples 5 to 17, the starting material was produced from a completely catalyst-free esterification product of terephthalic acid and ethylene glycol (EG) with the following properties:

| | |
| --- | --- |
| Intrinsic viscosity: | 0.20 dl/g |
| Saponification number: | 565.2 mg KOH/g |
| Conversion: | 96.1% |
| Acid number: | 22 mg KOH/g |
| Free EG: | 0.12 weight % |
| DEG: | 0.77 weight % |

Examples 5–11

Comparison of Catalysts 100 g each of the esterification product were melted with the selected catalysts at 270° C. for up to 50 min. under atmospheric pressure. Then, the pressure was gradually reduced to 0.1 mbar (abs.) within 50 min. and the temperature raised to 280° C. Polycondensation was subsequently carried out at 280° C. and 0.1 mbar for 120 min. The polyester-polycondensate was solidified in the liquid nitrogen, ground, and analyzed. The catalysts used were:

| | |
| --- | --- |
| Sb | Antimony triacetate from Elf Atochem (Philadelphia, PA, USA) as solution in ethylene glycol. |
| U13X | Zeolite 13X (UOP, Erkrath, Germany) water content: 3.5 weight %, average particle size (d-50): 2.7μ, solubility in esterification product ($L_{VE}$) at 260° C.: 4 weight %; used as a ground powder. |
| WNaP | Wessalite Na—P (Degussa, Hanau, Germany) water content: 10 weight %, d-50: 3.5μ, $L_{VE}$ at 260° C.: 6 weight %; used as ground powder. |
| WXD | Wessalite XD (Degussa, Hanau, Germany) water content: 22.5 weight %, d-50: 3.5μ, $L_{VE}$ at 260° C.: 8 weight %; used as ground powder. |
| WP-3.5 | Wessalite P (Degussa, Hanau, Germany) water content: 21 weight %, d-50: 3.5μ, $L_{VE}$ at 260° C.: 8 weight %; used as ground powder. |

-continued

| | |
|---|---|
| WP-0.65 | Wessalite P (Degussa, Hanau, Germany) water content: 21 weight. %, d-50: 0.65μ, $L_{VB}$ at 260° C.: 10 weight %; used as 45% suspension in ethylene glycol. |
| WP-0.35 | Wessalite P (Degussa, Hanau, Germany) water content: 21 weight. %, d-50: 0.35μ, $L_{VB}$ at 260° C.: 12 weight %; used as 45% suspension in ethylene glycol. |

The results are summarized in Table 2. Examples 5–9 are comparative examples and examples 10 and 11 are example according to the invention.

TABLE 2

| Example number | Catalyst Type | Conc.* [ppm] | I.V. [dl/g] | COOH [meq/kg] | DEG [weight %] | Color |
|---|---|---|---|---|---|---|
| 5 | Sb | 250 | 0.69 | 15 | 1.0 | White |
| 6 | U13X | 1000 | 0.39 | 15 | 0.97 | Yellow |
| 7 | WNaP | 1000 | 0.48 | 8 | 1.0 | White |
| 8 | WXD | 1000 | 0.50 | 10 | 0.90 | White |
| 9 | WP-3.5 | 1000 | 0.70 | 20 | 0.97 | White |
| 10 | WP-0.65 | 250 | 0.60 | 10 | 0.94 | White |
| 11 | WP-0.35 | 250 | 0.65 | 12 | 0.98 | White |

*In relation to polyester; with antimony triacetate as Sb, with the zeolites - as dry substance.

Examples 12–17

Effect of Additives 4000 g of the same esterification product used in Examples 5 to 11 were melted with the selected catalysts and, if applicable, additional additives, for up to 70 min. at 250° C. at atmospheric pressure. Subsequently the samples were heated up to 270° C. while stirring at atmospheric pressure for approximately 60 min. After a gradual reduction of the pressure over 50 min. to 0.5 mbar (abs.), the temperature was raised to 280° C., and the samples were polycondensed at 0.5 mbar until reaching the desired intrinsic viscosity. The polyester melt was pressed into a strand and granulated. The results are summarized in Table 3.

Examples 18–21

Post-processing and Coloring Additives 250 kg of a homogenous paste of terephthalic acid and ethylene glycol in a molar ratio of 1:1.1, as well as a phosphorus compound, were continuously fed (within 80 min.) into an esterification reactor maintained at 260° C. and atmospheric pressure, which was filled with approximately 30% of the estefification product of the previous batch. The selected zeolite catalyst was then added to the reactor in Examples 19 to 21. In Example 18, the catalyst was added a later time, simultaneous with the addition of the cobalt compound. Further estefification was subsequently carried out for 30 min. while raising the temperature to 270° C. During the entire estefification, the reaction water was separated from the reaction mix by a column. Next, the cobalt compound was added in each Example (and the zeolite catalyst added to Example 18) and the reaction pressure was reduced over 20 min. to 10 mbar (abs.). The reaction mixture was subsequently conveyed into a ring disc reactor (U.S. Pat. No. 3,617,225) and the polycondensation reaction performed at 270° to 275° C. and 0.5 mbar. After reaching the desired intrinsic viscosity, the pressure was adjusted to approximately 10 mbar and the polyester melts were conveyed, by means of a gear pump, to an underwater granulator device and granulated. The results are summarized in Table 4.

TABLE 3

| Example number | Additives(*) Type | Conc.* [ppm] | Δ I.V./h [dl/g-h] | I.V. [dl/g] | COOH [meq/kg] | DEG [weight %] | Color [b-value] |
|---|---|---|---|---|---|---|---|
| 12 | Sb | 195 | 0.23 | 0.653 | 13 | 0.92 | +2.5 |
| 13 | WP-3.5 | 750 | 0.24 | 0.721 | 25 | 0.86 | +5.0 |
| 14 | WP-3.5 | 400 | 0.15 | 0.739 | 33 | 0.94 | +6.0 |
| 15 | WP-0.35 + Irganox | 400 200 | 0.20 | 0.700 | 15 | 0.88 | +0.5 |
| 16 | WP-0.35 + CEPS | 400 20 | 0.18 | 0.623 | 12 | 0.90 | +2.8 |
| 17 | WP-0.65 + CEPS + CoAC | 400 20 15 | 0.16 | 0.646 | 18 | 0.92 | −2.3 |

(*)Irganox = Irganox 1010, pentaerythrityl-tetrakis[3-(3,5-di-tertbutyl-4-hydroxyphenyl) propionate), an antioxidant (Ciba-Geigy, Basel, Switzerland)
CEPS = Carboxyethylene phosphonic acid (Hoechst, Frankfurt/Main, Germany) concentration in ppm phosphorus.
CoAC = Cobalt diacetate, concentration in ppm of cobalt.

TABLE 4

| Example number | Additives(*) Type | Conc.* [ppm] | Poly-cond. Length [min.] | Polyester I.V. [dl/g] | COOH [meq/kg] | DEG [weight %] | Turbidity level [NTU] | Color [b-value] |
| --- | --- | --- | --- | --- | --- | --- | --- | --- |
| 18 | WP-0.35 + CoAC + CEPS | 400 10 20 | 170 | 0.62 | 11 | 0.60 | 0.7 | −3.8 |
| 19 | WP-0.35 + CoAC + PEE | 400 14 14 | 214 | 0.62 | 7 | 0.70 | 1.8 | −3.2 |
| 20 | WP-0.35 + CoAC + $H_3PO_4$ | 400 5 10 | 264 | 0.62 | 10 | 0.79 | 1.3 | +3.2 |
| 21 | WP-0.35 + CoAC + TTPG | 400 5 10 | 264 | 0.63 | 9 | 0.77 | 1.2 | +0.6 |

(*)PEE = Diethylcarboxymethyl phosphonate (Hoechst, Frankfurt, Germany).
TTPG = Tris(triethylene glycol)phosphate
Concentration of all phosphorous compounds in ppm phosphorus.

While the present invention has been described by means of specific embodiments, it will be understood that modifications may be made without departing from the spirit of the invention. The scope of the invention is not considered to be limited by the description of the invention set forth in the specification and examples, but rather defined by the following claims.

We claim:

1. A zeolite polycondensation catalyst used in the production of polyester, comprising an alkali- or alkaline earth metal aluminum silicate zeolite having an original water content of 12 to 30 weight % and a solubility of over 8.0 weight % as measured at 260° C. in an esterification mixture consisting essentially of bis(hydroxy ethylene)terephthalate, and an average particle size of less than 1.0μ.

2. The zeolite catalyst of claim 1, wherein the zeolite polycondensation catalyst has a molar ratio of $SiO_2:Al_2O_3$ of from about 1.0 to about 4.0.

3. The zeolite catalyst of claim 1, characterized in that after 2 hours of boiling of a 30- to 50% suspension of the zeolite catalyst in ethylene glycol, the atomic ratio of dissolved Si to the dissolved Al in the ethylene glycol is not greater than 0.5.

4. The zeolite catalyst of claim 1, wherein the alkali metal is sodium.

5. The zeolite catalyst of claim 1, wherein up to about 5 weight % of the alkali- or alkaline earth metal is optionally replaced by bivalent cobalt.

6. The zeolite catalyst of claim 1, wherein the original water content of the catalyst is from about 18 to about 25 weight %, and the solubility of the catalyst in the esterification mixture is at least 10 weight % and the average particle size of the catalyst is less than about 0.5μ.

7. A process for the production of polyester comprising:
esterification of at least one dicarboxylic acid with at least one diol or reesterification of a dicarboxylic acid dialkyl ester with at least one diol;
precondensation; and
polycondensation in the presence of the zeolite polycondensation catalyst of claim 1.

8. The process of claim 7, wherein from about 10 to about 800 ppm of the polycondensation catalyst is added at any time before the beginning of the polycondensation step.

9. The process of claim 7, wherein from about 50 to about 500 ppm of the polycondensation catalyst is added at any time before the beginning of the polycondensation step.

10. The process of claim 7, wherein the zeolite polycondensation catalyst has a molar ratio of $SiO_2:Al_2O_3$ of from about 1.0 to about 4.0.

11. The process of claim 7, wherein the esterification or reesterification proceeds in the presence of conventional catalysts and wherein the conventional catalysts are deactivated by the addition of an approximately stoichiometric quantity of a phosphorus-oxygen compound before the addition of the zeolite polycondensation catalyst.

12. The process of claim 7, wherein the esterification or reesterification proceeds in the presence of from about 1 to about 50 ppm phosphorus in the form of a phosphorus compound and in the absence of conventional catalysts and precondensation and polycondensation proceeds in the presence of from about 10 to about 800 ppm zeolite polycondensation catalyst.

13. The process of claim 7, wherein the polyester is a polyethylene terephthalate and contains from about 0 to about 10 weight % isophthalic acid or from about 0 to about 10 weight % 1,4-cyclohexane dimethanol.

14. The process of claim 13, wherein the polyester has a turbidity level of less than about 2.0 NTU.

15. The process of claim 7, further comprising adding from about 2 to about 50 ppm cobalt.

16. The process of claim 15, wherein the cobalt is in the form of a polyester-soluble salt.

17. The process of claim 15, wherein the cobalt is a component of the zeolite polycondensation catalyst.

18. The process of claim 14, wherein the polyester is further processed into bottles.

19. The process of claim 18, wherein the bottles are refillable beverage bottles.

* * * * *